United States Patent
Guenther et al.

(10) Patent No.: US 10,553,199 B2
(45) Date of Patent: Feb. 4, 2020

(54) LOW-DIMENSIONAL REAL-TIME CONCATENATIVE SPEECH SYNTHESIZER

(71) Applicant: Trustees of Boston University, Boston, MA (US)

(72) Inventors: Frank Harold Guenther, Boston, MA (US); Alfonso Nieto-Castanon, Ciudad de Buenos Aires (AR)

(73) Assignee: Trustees of Boston University, Boston, MA (US)

(*) Notice: Subject to any disclaimer, the term of this patent is extended or adjusted under 35 U.S.C. 154(b) by 92 days.

(21) Appl. No.: 15/570,889

(22) PCT Filed: May 20, 2016

(86) PCT No.: PCT/US2016/033525
§ 371 (c)(1),
(2) Date: Oct. 31, 2017

(87) PCT Pub. No.: WO2016/196041
PCT Pub. Date: Dec. 8, 2016

(65) Prior Publication Data
US 2018/0108342 A1 Apr. 19, 2018

Related U.S. Application Data

(60) Provisional application No. 62/171,458, filed on Jun. 5, 2015.

(51) Int. Cl.
*G10L 13/00* (2006.01)
*G10L 13/04* (2013.01)
(Continued)

(52) U.S. Cl.
CPC .............. *G10L 13/04* (2013.01); *G06F 3/048* (2013.01); *G06F 3/0482* (2013.01);
(Continued)

(58) Field of Classification Search
CPC ......... G10L 13/00; G10L 13/08; G10L 13/04; G10L 13/06; G10L 13/02; G10L 13/027;
(Continued)

(56) References Cited

U.S. PATENT DOCUMENTS 4,618,985 A 10/1986 Pfeiffer
5,613,056 A * 3/1997 Gasper ................. G06T 13/205
345/473
(Continued)

FOREIGN PATENT DOCUMENTS

WO 8900324 1/1989
WO 2014130571 8/2014
WO 2014130571 A1 8/2014

OTHER PUBLICATIONS

Katsir. Artificial Bandwidth Extension of Band Limited Speech Based on Vocal Tract Shape Estimation. 2012. Retrieved from the Internet<URL:http://webee.technion.ac.il/Sites/People/lsraelCohen/Info/Graduates/PDF/ItaiKatsir_MSc_2012.pdf>.
(Continued)

*Primary Examiner* — Abdelali Serrou
(74) *Attorney, Agent, or Firm* — BainwoodHuang

(57) ABSTRACT

A method of providing real-time speech synthesis based on user input includes presenting a graphical user interface having a low-dimensional representation of a multi-dimensional phoneme space, a first dimension representing degree of vocal tract constriction and voicing, a second dimension representing location in a vocal tract. One example employs a disk-shaped layout. User input is received via the interface and translated into a sequence of phonemes that are rendered on an audio output device. Additionally, a synthesis method includes maintaining a library of prerecorded samples of diphones organized into diphone groups, continually receiving a time-stamped sequence of phonemes to be synthesized, and selecting a sequence of diphone groups with their time
(Continued)

stamps. A best diphone within each group is identified and placed into a production buffer from which diphones are rendered according to their time stamps.

15 Claims, 9 Drawing Sheets

(51) Int. Cl.
| | |
|---|---|
| *G10L 13/06* | (2013.01) |
| *G10L 19/00* | (2013.01) |
| *G10L 13/08* | (2013.01) |
| *G10L 15/00* | (2013.01) |
| *G06F 3/0482* | (2013.01) |
| *G06F 3/0484* | (2013.01) |
| *G06F 3/048* | (2013.01) |
| *G10L 13/027* | (2013.01) |

(52) U.S. Cl.
CPC ........ *G06F 3/04842* (2013.01); *G10L 13/027* (2013.01); *G10L 13/06* (2013.01); *G10L 13/08* (2013.01); *G10L 15/00* (2013.01); *G10L 19/00* (2013.01)

(58) Field of Classification Search
CPC . G10L 13/043; G10L 19/00; G10L 2015/025; G06F 2203/0331; G06F 3/014; G06F 3/016; G06F 3/0304; G06F 3/048; G06F 3/0482; G06F 3/04842
See application file for complete search history.

(56) References Cited

U.S. PATENT DOCUMENTS

| | | | |
|---|---|---|---|
| 5,729,694 A | 3/1998 | Holzrichter et al. | |
| 5,774,854 A | 6/1998 | Sharman | |
| 5,842,167 A | 11/1998 | Miyatake et al. | |
| 6,041,297 A | 3/2000 | Goldberg | |
| 6,115,482 A | 9/2000 | Sears et al. | |
| 7,174,295 B1 | 2/2007 | Kivimaki | |
| 7,216,076 B2 | 5/2007 | Atal | |
| 8,594,993 B2* | 11/2013 | Qian | G10L 21/003 704/2 |
| 2002/0143543 A1 | 10/2002 | Sirivara | |
| 2005/0008179 A1 | 1/2005 | Quinn | |
| 2006/0100878 A1 | 5/2006 | Conkie | |
| 2007/0298385 A1* | 12/2007 | Jenkins | G09B 5/06 434/156 |
| 2008/0195394 A1* | 8/2008 | Francioli | G09B 5/06 704/271 |
| 2010/0076762 A1 | 3/2010 | Cosatto et al. | |
| 2010/0286986 A1 | 11/2010 | Beutnagel et al. | |
| 2011/0106792 A1* | 5/2011 | Robertson | G10L 15/26 707/723 |
| 2012/0065961 A1* | 3/2012 | Latorre | G10L 13/07 704/9 |
| 2012/0109654 A1 | 5/2012 | Nurminen et al. | |
| 2013/0253903 A1* | 9/2013 | Stephen | G06F 17/27 704/2 |
| 2013/0262121 A1* | 10/2013 | Kayama | G10L 13/04 704/267 |
| 2015/0081306 A1* | 3/2015 | Mori | G10L 13/033 704/260 |
| 2015/0293902 A1* | 10/2015 | Bredikhin | G10L 13/08 704/9 |

OTHER PUBLICATIONS

Dusan. Statistical Estimation of Articulatory Trajectories from the Speech Signal using Dynamical and Phonological Constraints. 2000. Retrieved from the internet:<URL: http://www.collectionscanada.gc.ca/obj/s4/f2/dsk1/tape4/PQDD_0022/NQ51191.pdf>.

* cited by examiner

LOW-DIMENSIONAL REAL-TIME CONCATENATIVE SPEECH SYNTHESIZER

STATEMENT OF GOVERNMENT RIGHTS

The invention was made with US Government support under Contract No. DC002852 awarded by the National Institutes of Health. The Government has certain rights in the invention.

BACKGROUND

The present invention is related to the field of real-time speech synthesis, used for example as a substitute for voice-generated speech by persons who have lost control over their vocal apparatus due to disease.

Different types of speech synthesis techniques and systems are known, including text-to-speech systems, articulatory synthesizers, and acoustic or "formant" synthesizers. Text-to-speech systems are generally not suited for conversation-like speech, because of the requirement that users type out all words and the limitation of fixed or "canned" words and relative inexpressiveness. The requirement for typing may be especially problematic for users who are paralyzed or otherwise limited in the speed at which they can generate user input to the system. Both articulatory and formant synthesizers generally require adjustment of a high number of parameters for accurate operation, i.e., to achieve desired speech quality, and thus are viewed as high-dimensional systems from a control perspective. If not properly adjusted, these systems may provide relatively low speech quality, for example due to difficulty with rendering consonants.

SUMMARY

It is desired to provide real-time speech synthesis that has high speech quality while requiring generally low-dimensional user input and control. With such characteristics, a synthesis technique may be more widely adopted and utilized, enhancing the ability of different populations of people to engage in quality conversational speech.

Presently disclosed methods and apparatus have two aspects that promote the above goals. In one aspect, usability is enhanced by a two-dimensional graphical interface for accepting user input, where the interface represents a complete set or "space" of phonemes from which speech can be synthesized. The two-dimensional layout reflects vocal tract morphology and use and thus the interface may be learned relatively easily and used efficiently and effectively. In another aspect, a modified diphone synthesis technique is used that provides high quality synthesized speech with relatively low computing demand at rendering time. High quality is provided in part by enabling users to control duration of sounds as is done in vocal speech for emphasis or other effects.

More particularly, in one aspect a method is disclosed for operating a computerized device to provide real-time synthesis of speech based on user input. The method includes presenting a graphical user interface having a low-dimensional representation of a multi-dimensional phoneme space, for example a first dimension representing degree of vocal tract constriction and voicing, and a second dimension representing location in a vocal tract. The method further includes receiving user input via the interface and translating received user input into a sequence of phonemes, and rendering the sequence of phonemes on an audio output device.

In some embodiments, the first dimension further represents single versus diphthong vowel sounds.

In some embodiments, the low-dimensional representation has a disk-shaped layout, and the first and second dimensions are selected from a radial dimension and an angular dimension of the disk-shaped layout. In one specific example, the radial dimension represents the first dimension of the phonemic space, and the angular dimension represents the second dimension of the phonemic space.

In some embodiments, the computerized device uses a touch sensitive display and the user input is received as sets of swipes between segments of the interface that represent corresponding phonemes. Each set of swipes corresponds to a unitary utterance of one or more syllables (e.g., a word), with the user maintaining unbroken contact with the touch sensitive display for each set. The sets of swipes are separated by intervals corresponding to silence in which the user has broken contact with the touch sensitive display.

There may be alternative modes of rendering, which may be user selectable. In one mode, individual utterances are rendered upon completion of their corresponding sets of swipes. The durations of rendered phonemes may be fixed or may correspond to duration of user dwell on the corresponding segments of the low-dimensional representation (i.e., how long a user's finger or other pointer rests on each phoneme-specific segment).

In another mode, individual syllables are rendered upon completion of their corresponding individual swipes of the sets of swipes. The durations of rendered phonemes may correspond to respective durations of user dwell on the corresponding segments of the low-dimensional representation.

In yet another mode, individual phonemes are rendered at respective times of user selection. The phonemes may be rendered at either the beginning or ending of user selection, i.e., when a user first lands on a segment or when a user leaves a segment. Alternatively, the phonemes may be rendered throughout respective durations of selection by the user as the user dwells on the respective segments of the low-dimensional representation.

In some embodiments, rendering is performed in a user-selected one of a plurality of available rendering modes, the rendering modes including (1) rendering individual utterances upon completion of their corresponding sets of swipes, (2) rendering individual syllables upon completion of their corresponding individual swipes of the sets of swipes, and (3) rendering individual phonemes at respective times of user selection by dwelling on corresponding segments of the low-dimensional representation.

In some embodiments, rendering includes accessing a stored library of post-processed speech samples including variable-length versions of diphones used to match durations specified by the user input.

In another aspect, a method is disclosed for operating a computerized device to provide real-time synthesis of speech using a particular real-time synthesis technique. The method includes maintaining a library of prerecorded samples of diphones, each diphone sample including a transition between a respective pair of phonemes, the diphone samples being organized into diphone groups at least some of which include multiple examples of transitions between a respective single pair of phonemes. The different examples include different durations. The method further includes continually receiving a time-stamped sequence of phonemes to be synthesized, and based on successive pairs of the phonemes selecting a sequence of respective diphone groups and corresponding diphone time stamps. The method further includes continually generating a sequence of production diphones from the sequence of diphone groups by (1) identifying a best diphone within each group, the best diphone being part of the optimal path most closely matching each individual diphone duration calculated from successive diphone time stamps as well as minimizing artifacts resulting from stitching dissimilar sound samples, and (2) placing each identified best diphone into a production buffer with a corresponding diphone time stamp. The diphones are sequentially rendered from the production buffer at respective times corresponding to the diphone time stamps.

In some embodiments, the groups of diphones are diphone lists, and continually generating the sequence of production diphones includes (1) placing successive diphones lists on a diphone lists queue, and (2) computing a desired trajectory of rendering across a diphone in the production buffer and diphone lists in the diphone lists queue, the computing identifying the respective best diphones for the diphone lists.

In some embodiments, the diphones have respective GO/noGO flags used to selectively delay production of the diphones based on a mode selected for rendering, the mode being selected from a set of modes that differ in timing of initiating rendering.

In some embodiments, rendering includes switching to silence in cases including (1) a missing diphone sample for which there is no recorded speech sample, (2) a current speech sample reaching an end of the current production buffer when a current production value is not already silence, signifying that a current phoneme production duration is longer than is available from recorded samples, and (3) absence of valid diphone transitions between two diphones, as occurs for a planned phoneme duration longer than is available from recorded samples.

In some embodiments, the library includes post-processed samples of collected speech samples including linking points for linking diphones together and extended samples for longer-duration renderings of recorded diphone samples.

Also in some embodiments, receiving the sequence of phonemes includes (1) presenting a graphical user interface to a user, the graphical user interface having a low-dimensional representation of a multi-dimensional phoneme space, a first dimension representing degree of vocal tract constriction and voicing, a second dimension representing location in a vocal tract, and (2) receiving user input via the interface and translating received user input into a sequence of phonemes.

Computerized devices are also disclosed that include respective processors, input/output circuitry, and memory containing instructions that are executed by the processors to cause the computerized devices to perform corresponding methods including methods as outlined above.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
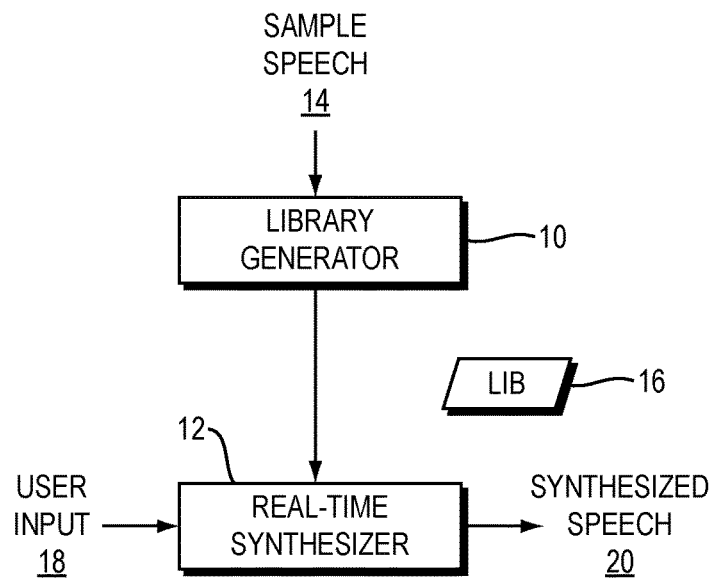
FIG. 1 is a block diagram of a speech synthesis system.

FIG. 1 shows a system including two computers shown as a library generator computer 10 and a real-time synthesizer computer 12. Although shown as two separate computers, other embodiments may employ only one computer or may employ more than two computers. In this description, "computer" refers to components conventionally called "computers", such as personal computers, tablet computers, server computers, etc., as well as to computerized devices including computer technology and functionality, such as smart phones, smart televisions, and devices that may be purpose-built or purpose-configured as platforms for the functionality described herein. As one specific example, the real-time synthesizer computer 12 may be realized as a purpose-built consumer device tailored for use by impaired users, very young users, etc.

In operation, the library generator computer 10 receives sample speech 14 and performs processing to generate a library 16 of speech samples that is provided to the real-time synthesizer computer 12. The sample speech 14 may be received directly from a human speaker via a microphone, or it may be received in a pre-recorded form. In the present description it is assumed, without loss of generality, that the library generator computer 10 captures live spoken speech. The captured speech samples are post-processed in a manner described below to generate the library 16 whose contents are particularly suited for use in the processing performed by the real-time synthesizer computer 12.

The real-time synthesizer computer 12 uses the contents of the library 16, responsive to user input 18, to generate synthesized speech 20. As described more below, the user's control is provided by a selector type of user input device. In one embodiment, a touch sensitive display is used. The user selects representations of a sequence of phonemes for words that the user wishes to have synthesized. The real-time synthesizer computer 12 interprets the user selections and performs the speech synthesis in a real-time manner using the contents of the library 16. Specifically, the real-time synthesizer computer 12 generates a stream of samples of sound pairs called "diphones", and these samples are converted to the audio signals that drive an audio output device. In the present description, the term "rendering" is used to describe generating sound from a stream of data representing sound samples such as diphones.

In the present description the terms "phoneme" and "diphone" may each refer to different aspects or representations depending on context. For example, "phoneme" generally refers to a "sound", i.e., an audible pressure disturbance in air or other medium. In the disclosed system and methods, both actual sounds and certain representations or analogs of the sounds are described. Thus the term "phoneme" may refer to an actual rendered phonemic sound, or to an analog waveform representing such a phonemic sound, or to a collection or unit of digital data representing analog samples of such a phonemic sound, or to data that merely identifies one phonemic sound as distinct from another (e.g., addresses or other unique identifiers of respective units of data in the library 16 for corresponding phonemic sounds). The term "diphone" is used in a similar manner. The actual meanings will be clear in context to those skilled in the art.

Figure 2:
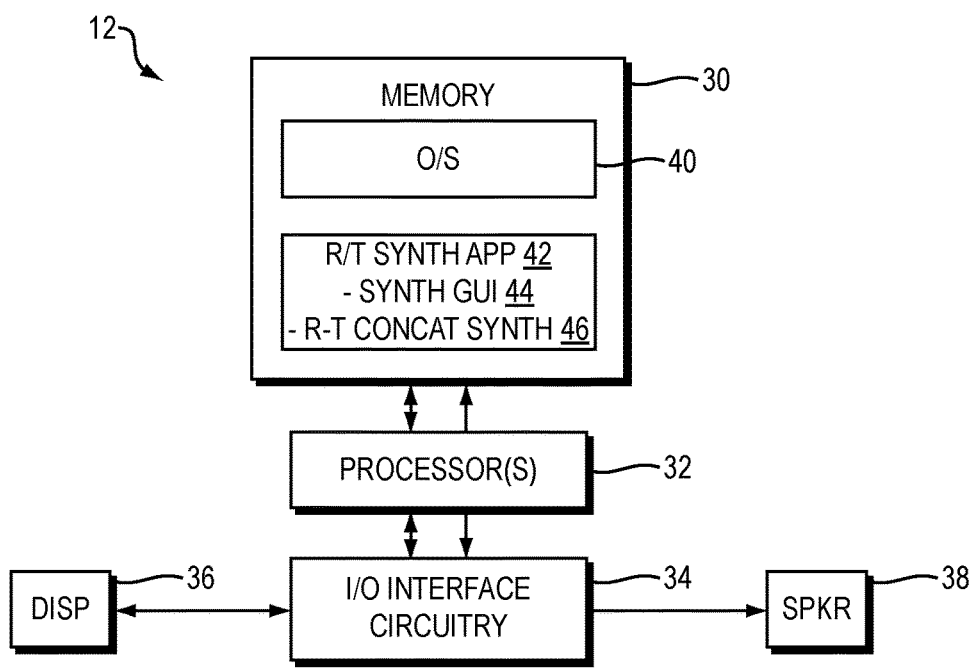
FIG. 2 is a block diagram of a real-time synthesizer computer.

FIG. 2 shows the organization of the real-time synthesizer computer 12. It includes a memory 30, processor(s) 32, and input/output (I/O) interface circuitry 34. The I/O interface circuitry 34 provides electrical and functional interfaces to a display (DISP) 36 and a speaker (SPKR) 38. As previously indicated, in one embodiment the display 36 is a touch sensitive display and thus serves as both a user input device as well as a display device for displaying graphical output to the user. Although not shown, the real-time synthesizer computer 12 generally also includes non-volatile secondary storage such as a disk drive, Flash memory array, etc.

The memory 30 stores computer program instructions that are executed by the processors 32 to cause the real-time synthesizer computer 12 to function in a corresponding manner. In particular, as generally known the instructions include instructions of an operating system (O/S) 40 and one or more application programs, in this case a real-time synthesizer application (R/T SYNTH APP) 42. In the illustrated embodiment, the real-time synthesizer application 42 includes two major components, a synthesizer graphical user interface (SYNTH GUI) 44 and a real-time concatenative synthesizer (R-T CONCAT SYNTH) 46. FIG. 2 shows the program instructions in the memory 30 from which the instructions are retrieved and executed by the processors 32. The instructions may also be stored on a separate computer-readable storage medium from which they are retrieved and loaded into the memory 30, as generally known in the art.

In operation, the real-time synthesizer computer 12 performs user-directed speech synthesis by executing the instructions of the synthesizer GUI 44 and real-time concatenative synthesizer 46. The synthesizer GUI 44 is responsible for displaying a synthesizer interface pattern to the user and accepting and using user touch input representing selection of phonemes. The real-time concatenative synthesizer 46 operates in response to the stream of user-selected phonemes to synthesize and render corresponding speech via the speaker 38. Details of these operations are provided more below.

Figure 3:
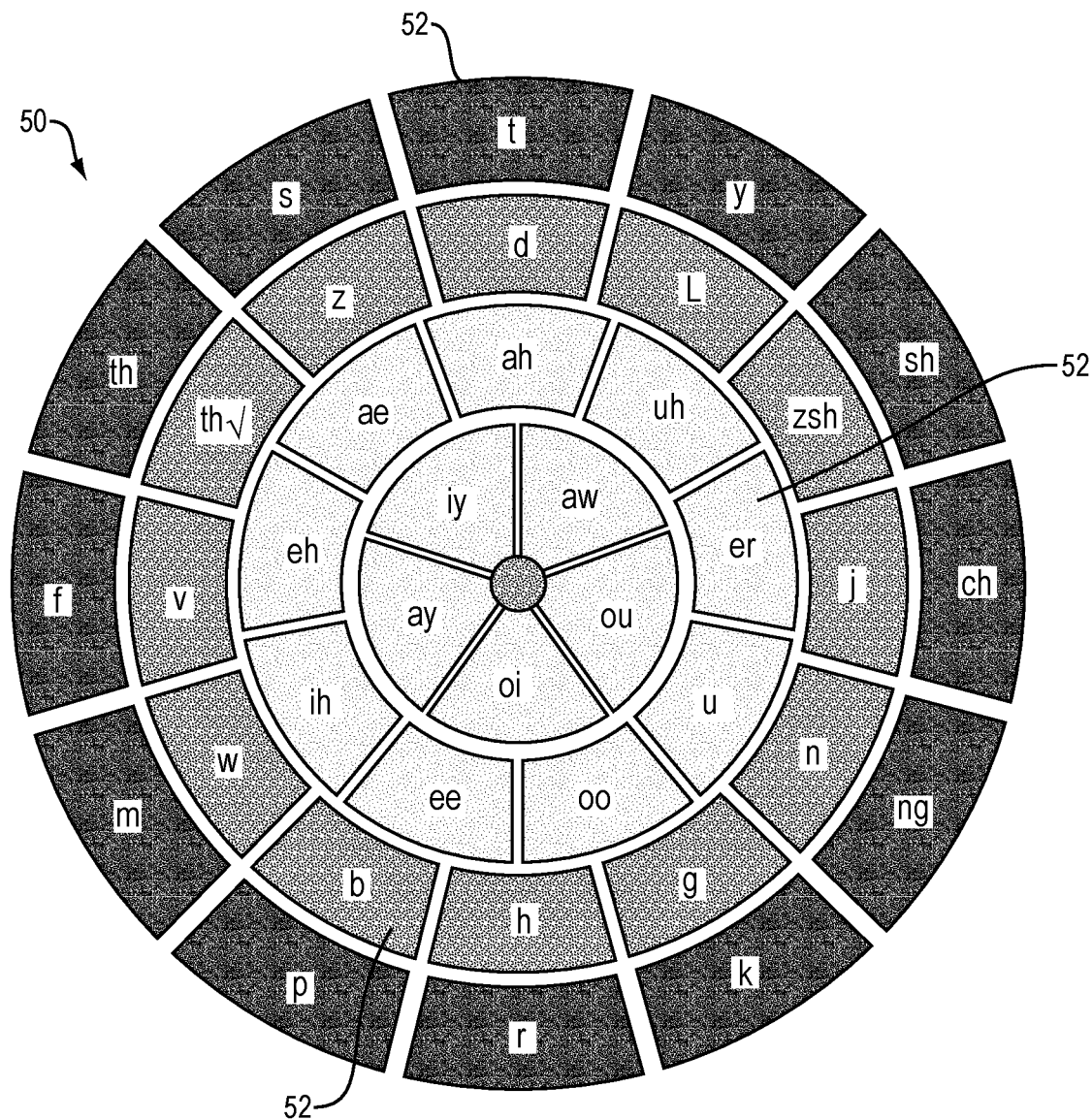
FIG. 3 is a diagram of a graphical user interface with a representation of a phonemic space.

FIG. 3 is a graphical synthesizer interface 50 as presented to a user on the display 36 (FIG. 2) and used as described below to provide user selection of a stream or sequence of phonemes that represent a sequence of spoken words or utterances. The synthesizer interface 50 is a disk-shaped graphic having an arrangement of English alphabet letters representing discrete sounds or phonemes. The synthesizer interface 50 provides a two-dimensional representation of the sound space or phoneme space that is available for speech synthesis. In the case of the disk shape as shown, the two graphical dimensions are the radial and angular dimensions, and the two corresponding phonemic dimensions are degree of vocal tract constriction (i.e., voicing and stops) and vocal tract location (i.e., shaping of oral cavity for distinct phonemes).

In the radial dimension, the synthesizer interface 50 is divided into four concentric rings, and each ring is divided at regular angles into wedge-shaped segments 52. The rings progress from diphthong vowels through hard consonants, and the angularly-separated segments 52 of each ring progress through different vocal tract shapes/locations for different phonemes of the ring-specific type. The innermost ring contains five segments 52 representing the vowel diphthongs aw, ou, oi, ay, iy as shown. The next ring contains nine segments 52 for single vowel sounds represented by ah, uh, er, . . . as shown. The next outer ring contains twelve segments 52 for the relatively soft consonants d, L, zsh, j, etc., and the outermost ring contains twelve segments 52 for the corresponding harder consonants t, y, sh, ch, etc. It will be appreciated that many radially adjacent consonant sounds are similar except for differences in the stopping or voicing. As an example, the sounds t and d differ primarily by the voicing of d.

In use, a user first places a selector (e.g., a finger or stylus on a touch sensitive display, or a user-controlled electronic pointer) on the segment 52 for the beginning sound of an utterance, and then traces or "swipes" among the segments 52 for the different phonemes of the utterance, at which point the user lifts the selector. Each swipe has a radial component for vowel-consonant transitions and an angular component for the location or sound-shaping transition. It will be appreciated that many syllables are specified by single swipes having either inward or outward movement, and others are specified by a pair of swipes, one from a consonant to a vowel and then another from the vowel to a consonant. Examples are given below. Additionally, there may be different ways of performing real-time speech rendering based on the pattern and especially timing of user swiping activity, and some embodiments may support multiple modes and some manner of selecting among the modes. These are also described more below.

Figure 4:
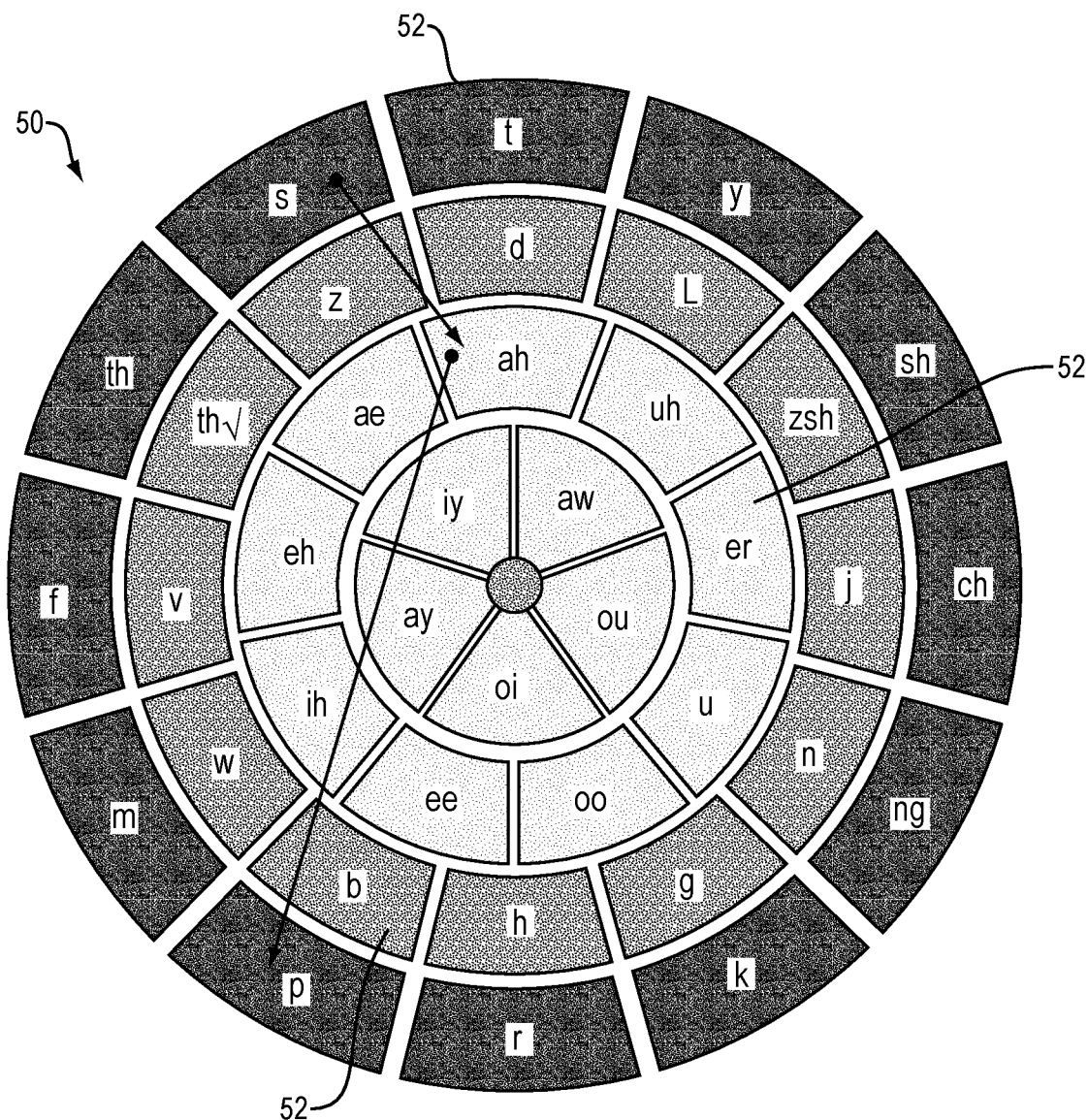
FIG. 4 is a diagram of the graphical user interface with an example set of user-generated swipes corresponding to an utterance.

FIG. 4 illustrates an example of use, specifically a pattern used to specify the word sop. A user starts at the s located at about 11:00 on the outermost ring, swipes inwardly to the ah sound, then back outwardly and around to the p sound at about 7:00 on the outermost ring. The user maintains contact with the touch sensitive display while swiping, and breaks contact when the utterance is complete, which in this example is upon reaching the p. In the case of a user-controlled electronic selector such as an on-screen pointer, some other way of indicating termination of an utterance may be used such as dragging the selector to an area of no segments 50, for example.

Figure 5:
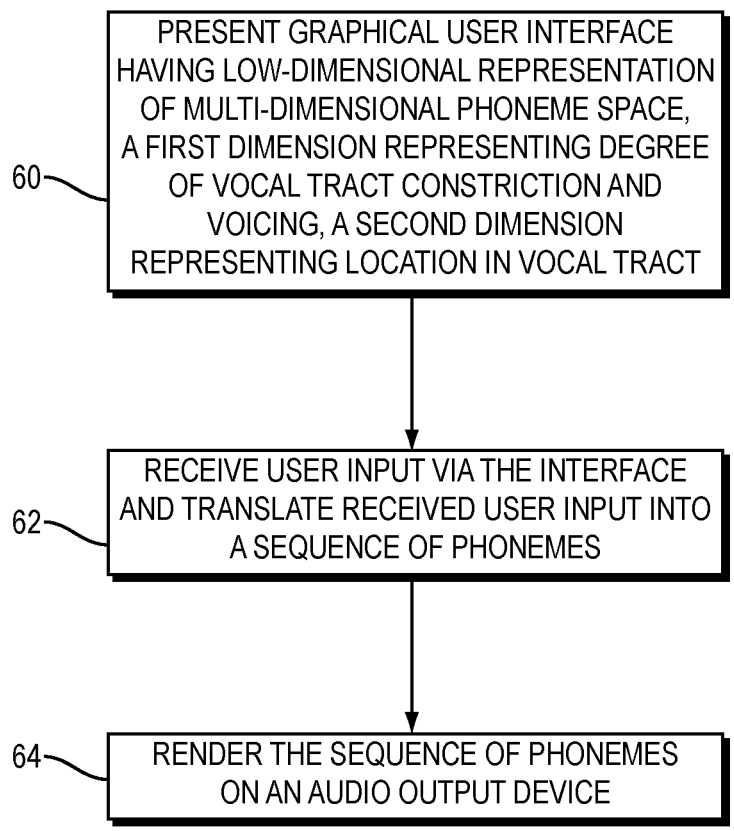
FIG. 5 is a flow diagram of a user-interface aspect of operation.

FIG. 5 presents a general flow of operation of the real-time synthesizer computer 12 with respect to the control of speech synthesis via the user interface 50 as described above. It will be appreciated that this operation is provided by execution of the synthesizer GUI 44 of the real-time synthesizer application 42 (FIG. 2).

At 60, the real-time synthesizer computer 12 presents a graphical user interface to the user, the graphical user interface having a low-dimensional representation of a multi-dimensional phoneme space, a first dimension representing a degree of constriction of the vocal tract and voicing, and a second dimension representing location in the vocal tract. As explained above, the disk-shaped interface 50 is an example of such a low-dimensional representation, using radial and angular graphical dimensions.

At 62, the real-time synthesizer computer 12 receives user input via the graphical user interface and translates the received user input into a sequence of phonemes. In the touch sensitive display embodiment described herein, user input is provided as an ordered set of points on the display 36 which map to segments of the interface 50 and their corresponding phonemes. The timing of user movement among the points is also preserved by assigning corresponding time stamps. Successive sets of points specify diphones for which diphone samples can be obtained from the library 16, as described more below.

At 64, the real-time synthesizer computer 12 renders the user-specified sequence of phonemes on an audio output device. This process involves smoothly stitching together successive diphones and using the time stamps to selectively shorten or lengthen syllables, which can help in providing emphasis or other cues. Details of this processing are given below.

Figure 6:
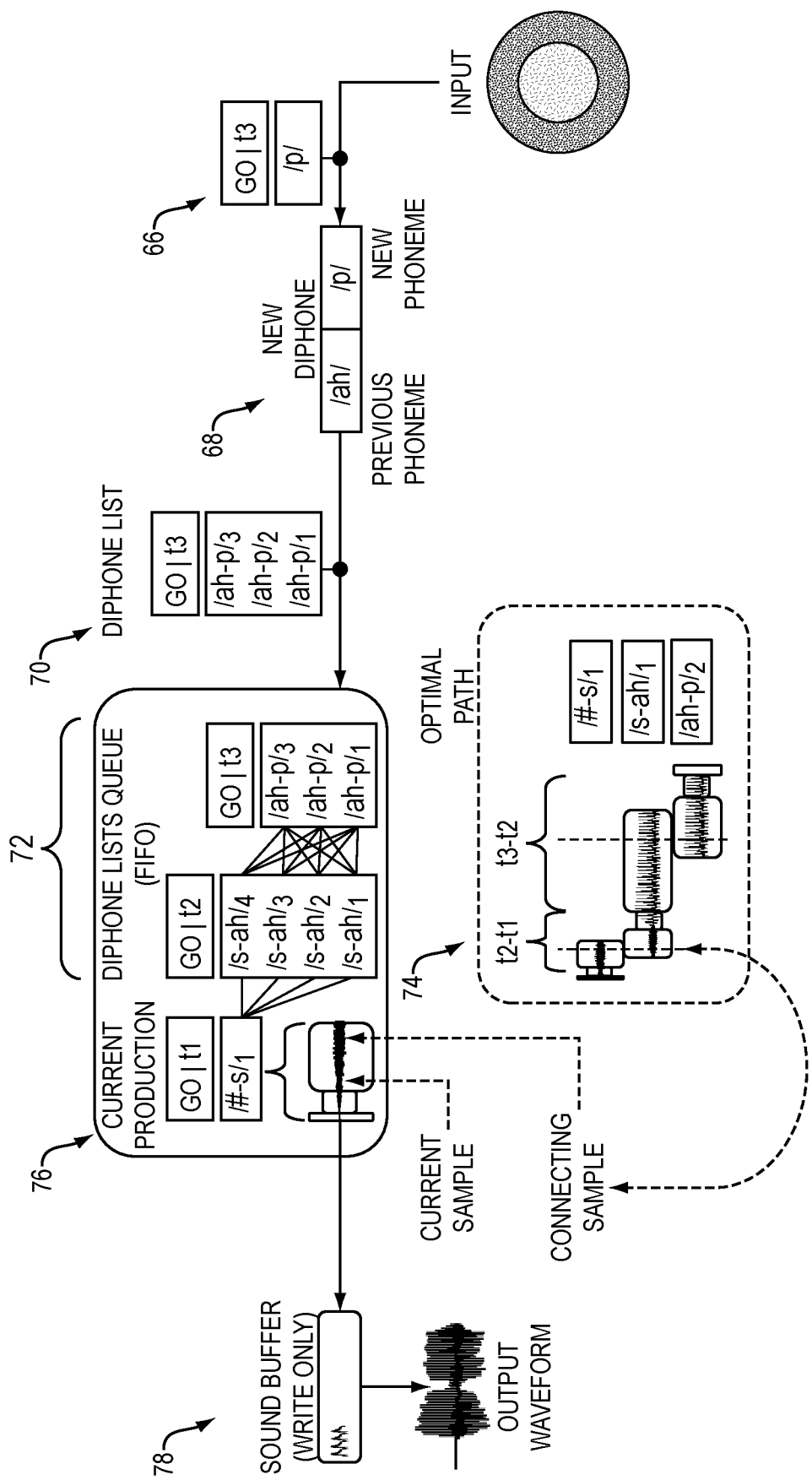
FIG. 6 is a schematic diagram illustrating real-time speech synthesis.

FIG. 6 is a schematic depiction of the processing involved in steps 62-64 of FIG. 5. The processing flow is right to left. In the illustrated example the user is specifying the word sop by swiping between the s, ah, and p sounds at respective times $t_1$, $t_2$ and $t_3$. Phonemes and diphones are shown with respective GO and tx fields:

tx: Timestamp of target phoneme
GO/noGO: A flag or signal for whether the phoneme is to be rendered. Use of GO allows for delayed production, i.e., a listed or queued phoneme is only processed for production when its GO flag is set. This can be useful for different modes as described below.

When a new target phoneme 66 is selected (e.g., /p/ at $t_3$), a new diphone 68 is identified by pairing the new diphone 68 with the immediately preceding phoneme (e.g., /ah/-/p/). A new corresponding diphone list 70 of available recorded samples of this the diphone 68 is then created. The diphone list 70 is added to a diphone lists queue 72, which operates in a first-in, first-out (FIFO) fashion. The diphone list 70 includes multiple versions of the diphone 68 having different durations.

Also at this point, an optimal path or trajectory is computed at 74 across the current production 76 (the diphone /#-s/$_1$ at $t_1$) and the elements within the diphone lists queue 72 (versions of /s-ah/ at $t_2$ and /ah-p/ at $t_3$). Each possible path between the current production 76 and each of the elements within the diphone list queue 72 is assigned a cost that captures both its similarity to the desired duration of syllables, as specified by the user's dwelling on segments 52, as well as a smooth stitching together of successive sound samples from the library 16 to minimize artifacts like audible differences between the same phoneme productions in two different audio samples as well as pops or other similar staccato noise. The optimal path is selected that minimizes the estimated cost. As shown, stitching uses the concept of a "connecting sample", i.e., a portion of a current sound that closely matches a portion of a next sound, so that transitioning playback between the two sounds at the connecting sample minimizes undesirable abrupt noises. When the current sample reaches the connecting sample, and there is at least one GO element in the queue 72, then the first diphone list is pulled from the queue 72, and its "winning" element is entered into the current production buffer 76. The winning element is the one that is part of the optimal path as computed at 74. In the illustrated example, the winning element for the /s-ah/ list is /s-ah/$_1$, and the winning element for the /ah-p/ list is /ah-p/$_2$. Also at this point, the current sample and connecting sample values are reset to those determined by the current optimal trajectory.

Actual sound rendering is performed by transferring sounds from the current production buffer 76 to a sound buffer 78, and then converting the sound samples to an analog waveform which is played out on an audio device such as the speaker 38. The transfer can be done in response to the size of the sound buffer decreasing below a pre-specified threshold. A new sound segment is pulled from the current production buffer 76 and placed in the sound buffer 78, then a current sample counter is increased.

There may be separate special processing for special cases. One type of special processing is "switch to silence", which includes modifying the diphone lists queue 72 by inserting in an appropriate place a silence phoneme, and re-computing the optimal trajectory. Switch to silence may be performed in the following cases:

1. There are no recorded samples for one diphone (missing diphone sample)
2. The current sample reaches the end of the current production buffer and the current production is not silence already (effective current phoneme production duration longer than available from samples)
3. There are no valid diphone transitions between two diphones (e.g. planned phoneme duration longer than available from samples)

Figure 7:
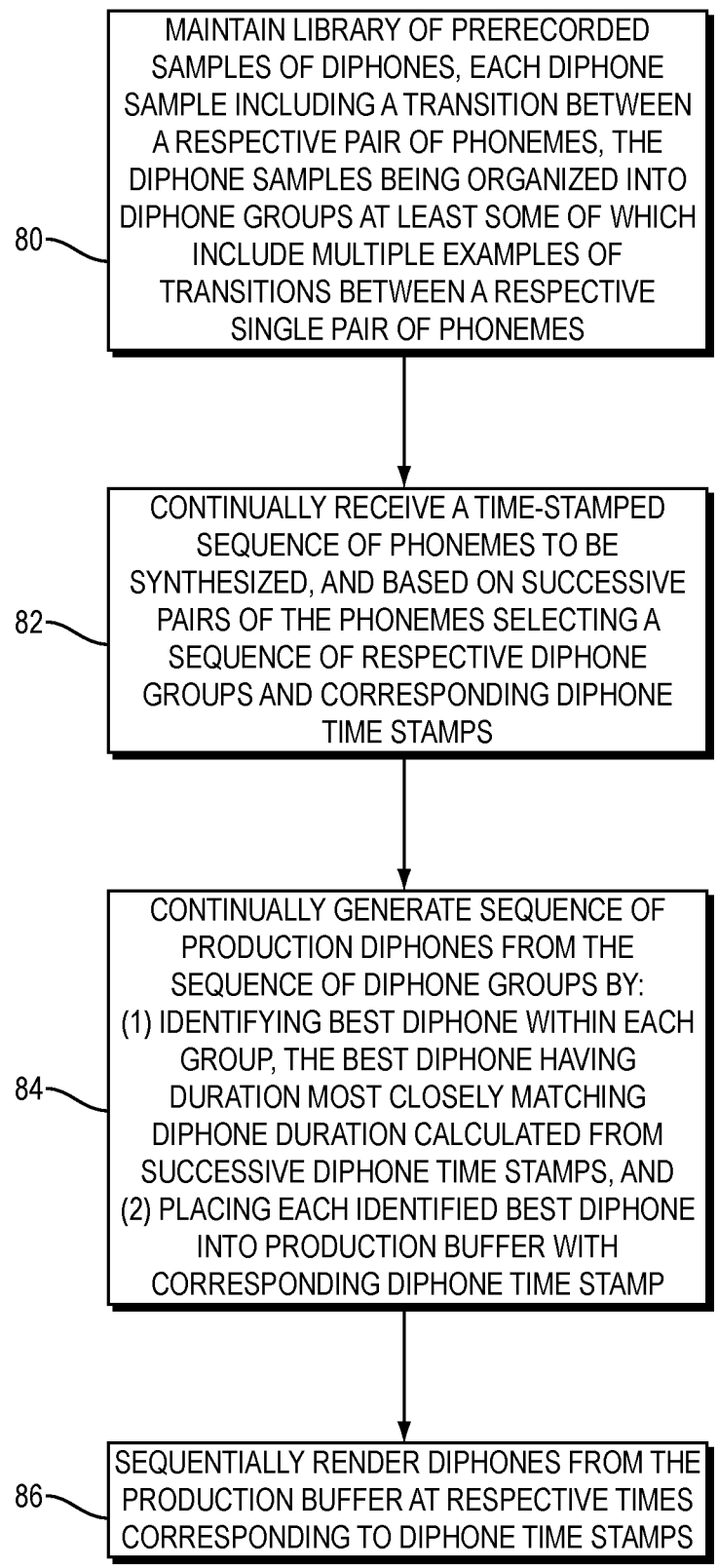
FIG. 7 is a flow diagram for a real-time speech synthesis aspect of operation.

FIG. 7 presents the above-described processing as a flow of operations.

At 80, the real-time synthesizer computer 12 maintains a library of prerecorded samples of diphones, each diphone sample including a transition between a respective pair of phonemes, the diphone samples being organized into diphone groups at least some of which include multiple examples of transitions between a respective single pair of phonemes. In one embodiment the diphone groups are realized as diphone lists 70 as shown in FIG. 6 and described above.

At 82, the real-time synthesizer computer 12 continually receives a time-stamped sequence of phonemes to be synthesized, and based on successive pairs of the phonemes, it selects a sequence of respective diphone groups having corresponding diphone time stamps. This corresponds to items 66, 68 and 70 in the processing of FIG. 6.

At 84, the real-time synthesizer computer 12 continually generates a sequence of production diphones from the sequence of diphone groups by (1) identifying a best diphone within each group, the best diphone being part of the optimal path most closely matching each diphone duration calculated from successive diphone time stamps as well as minimizing artifacts like audible differences between the same phoneme productions in two different audio samples as well as pops or other similar staccato noise resulting from stitching dissimilar sound samples between successive diphones, and (2) placing each identified best diphone into a production buffer with a corresponding diphone time stamp. This operation corresponds to items 72 through 76 in the processing of FIG. 6.

At 80, the real-time synthesizer computer 12 sequentially renders the diphones from the production buffer at respective times corresponding to the diphone time stamps. This operation corresponds to item 78 in the processing FIG. 6.

Figure 8:
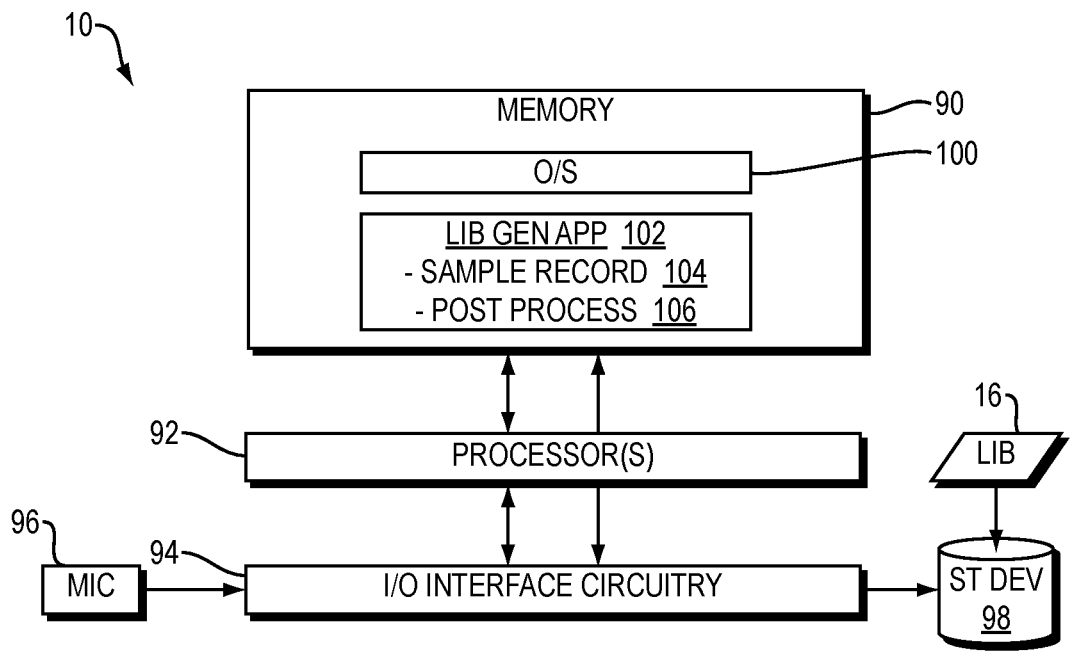
FIG. 8 is a block diagram of a library generator computer.

FIG. 8 shows the organization of the library generator computer 10. It includes a memory 90, processor(s) 92, and input/output (I/O) interface circuitry 94. The I/O interface circuitry 94 provides electrical and functional interfaces to a microphone (MIC) 96 and a storage device (ST DEV) 98 on which the library 16 is stored.

The memory 90 stores computer program instructions that are executed by the processors 92 to cause the library generator computer 10 to function in a corresponding manner. In particular, as generally known the instructions include instructions of an operating system (O/S) 100 and one or more application programs, in this case a library generator application (LIB GEN APP) 102. In the illustrated embodiment, the library generator application 102 includes two major components, a sample recording component 104 and a post processing component 106.

FIG. 8 shows the program instructions in the memory 90 from which the instructions are executed. The instructions may also be stored on a separate computer-readable storage medium from which they are retrieved and loaded into the memory 90, as generally known in the art.

In operation, the library generator computer 10 collects samples of speech via the microphone 96, stores the samples in association with data describing the phonemic content of the samples, and performs certain post-processing to generate the library 16 having content that is used in real-time concatenative speech synthesis such as described above with reference to FIG. 6. Details of these operations are provided below.

A complete usable library minimally includes: a) samples for each CV (consonant-vowel) and VC (vowel-consonant) phoneme sequence, typically produced in a CVC or CVCVC sequence; and b) samples for each individual phoneme produced in isolation, typically a long utterance of each phoneme (this is not required for phonemes like 'w' which are never produced in isolation). Ideally the library may also include several utterances for each sample, as well as other commonly used transitions in the target language (e.g. consonant clusters like /F/-/L/, /B/-/R/, etc.) Multiple utterances provide the system with more options for generating smooth transitions during real-time synthesis.

Figure 9:
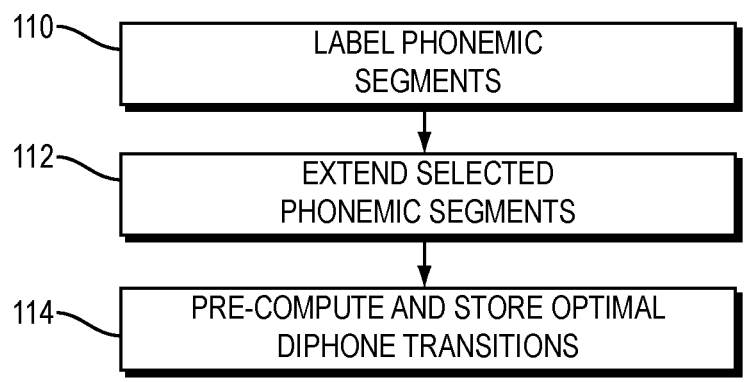
FIG. 9 is a flow diagram of a library generating aspect of operation.

FIG. 9 presents a high-level flow of processing performed by the library generator computer 10 to generate the contents of the library 16.

At 110, the phonemic segments from the speech samples are labelled. Each recorded sample is automatically pitch-marked, and individual phonemes are manually labeled (context-independent segments only). The labeled segments representing the 'stable' portion of each phoneme (for glides the 'stable' portion is considered the beginning of the production; for stops the 'stable' portion is considered the closure just before the release). Context-independent segments are expected to be relatively similar across all the instances of each phoneme.

At 112, selected phonemic segments are extended in duration. Samples that represent individual phonemes produced in isolation (C or V productions) are used to extend the duration of the rest of the utterances of the corresponding phonemes as long as possible. Each diphone sample is similarly extended by using the extended phoneme for the second phoneme in the diphone (e.g. /s-ah/ uses the original /s/ phoneme and the extended /ah/ phoneme).

At 114, optimal diphone transitions are pre-computed and stored along with the diphones. For each pair of matching extended segments (those sharing an intermediate phoneme, e.g. /s-ah/ and /ah-p/), and for each target time t, this pre-computing identifies an optimal way to link these two diphones that results in an intermediate phoneme (e.g. /ah/) with total duration t. This optimization is also computed constraining the linking point (n1) to be beyond any arbitrary value (n) in order to be able to link two diphones in real time when some portion of the first diphone may already have been produced.

Figure 10:
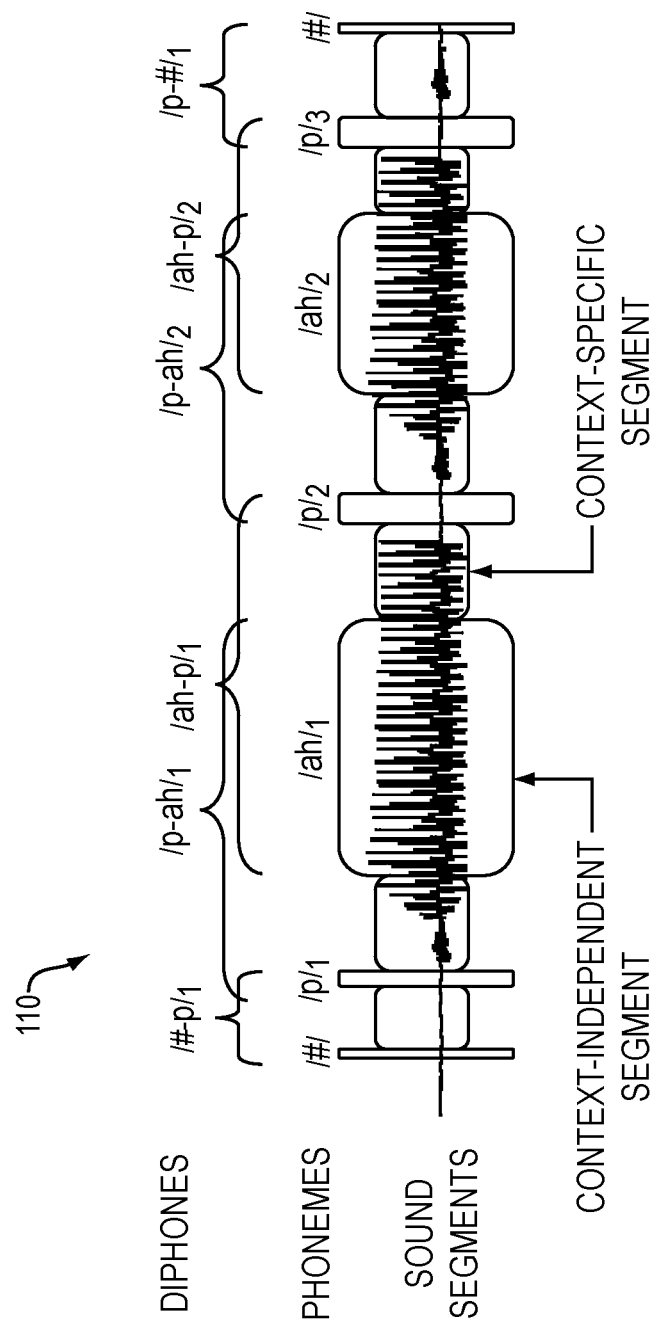
FIGS. 10-12 are schematic diagrams illustrating aspects of library generating operation.
Figure 11:
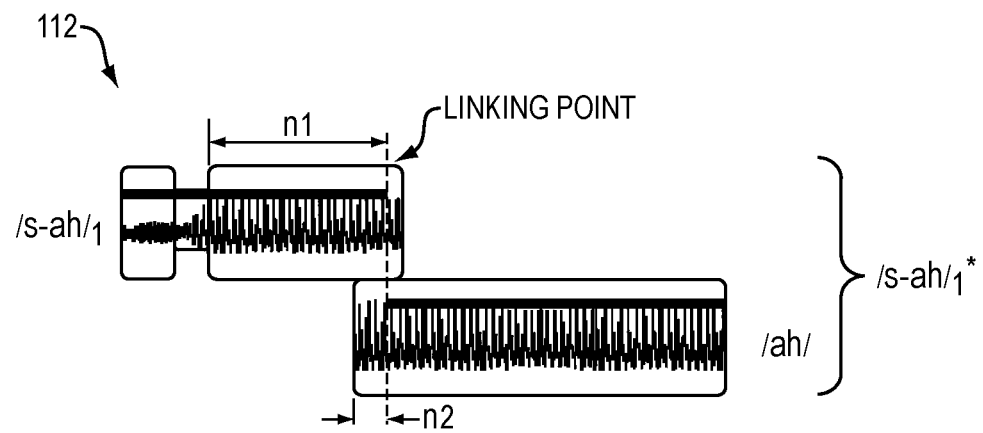
Figure 12:
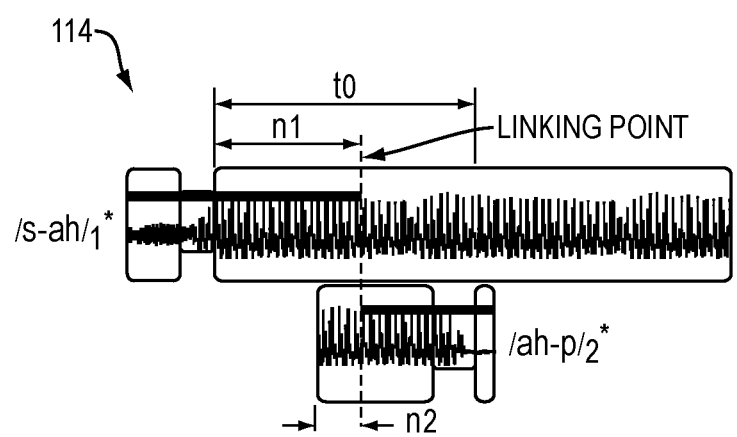

FIGS. 10-12 provide graphical examples of the operations of FIG. 9 using sound waveforms representing phonemes and diphones.

FIG. 10 illustrates the labelling of step 110.

FIG. 11 illustrates the phonemic segment extension of step 112. Mathematically, this operation can be described as finding $n_1, n_2$ that minimize a value $D(n_1,n_2) - \lambda_1 n_1 + \lambda_2 n_2$. $D(n_1,n_2)$ is a difference (RMS) between the $n_1$ pitch-synchronous waveform of the first sample and the $n_2$ pitch-synchronous waveform of the second sample (after amplitude normalization up to a 1:2 factor). The lambda factors attempt to result in relatively long 'extended diphone'.

FIG. 12 illustrates the pre-computation at step 114. Mathematically, the operation at 114 can be described as finding, for each t and n, $n_1, n_2$ that minimize a value $D(n_1,n_2) + \lambda_0 (t_0-t)$, subject to $t_0 > t$ & $n_1 > n$. This particular form of optimization cost function may be used because it allows a fast and efficient computation of all of the desired solutions using a sorted list of optima.

While various embodiments of the invention have been particularly shown and described, it will be understood by those skilled in the art that various changes in form and details may be made therein without departing from the scope of the invention as defined by the appended claims.

What is claimed is:

1. A method of operating a computerized device to provide real-time synthesis of speech based on user input, comprising:
    presenting a graphical user interface having a low-dimensional representation of a multi-dimensional phoneme space, a first dimension representing degree of vocal tract constriction and voicing, a second dimension representing location in a vocal tract;
    receiving user input via the interface and translating received user input into a sequence of phonemes; and
    rendering the sequence of phonemes on an audio output device.

2. The method of claim 1, wherein the first dimension further represents single versus diphthong vowel sounds.

3. The method of claim 1, wherein the low-dimensional representation has a disk-shaped layout, and the first and second dimensions are selected from a radial dimension and an angular dimension of the disk-shaped layout.

4. The method of claim 3, wherein the first dimension is the radial dimension, and the second dimension is the angular dimension.

5. The method of claim 1, wherein the computerized device uses a touch sensitive display and the user input is received as sets of swipes between segments of the low-dimensional representation representing corresponding phonemes, each set of swipes corresponding to a unitary utterance of one or more syllables and having unbroken user contact with the touch sensitive display, the sets of swipes separated by periods corresponding to silence and having broken user contact with the touch sensitive display.

6. The method of claim 5, wherein individual utterances are rendered upon completion of their corresponding sets of swipes.

7. The method of claim 6, wherein the durations of rendered phonemes corresponds to respective durations of user dwell on the corresponding segments of the low-dimensional representation.

8. The method of claim 5, wherein individual syllables are rendered upon completion of their corresponding individual swipes of the sets of swipes.

9. The method of claim 8, wherein the durations of rendered phonemes corresponds to respective durations of user dwell on the corresponding segments of the low-dimensional representation.

10. The method of claim 5, wherein individual phonemes are rendered at respective times of user selection by dwelling on corresponding segments of the low-dimensional representation.

11. The method of claim 10, wherein the phonemes are rendered at respective end times of selection as respective new swipes away from the phonemes are initiated.

12. The method of claim 10, wherein the phonemes are rendered throughout respective durations of selection by the user as the user dwells on the respective segments of the low-dimensional representation.

13. The method of claim 5, wherein rendering is performed in a user-selected one of a plurality of available rendering modes, the rendering modes including (1) rendering individual utterances upon completion of their corresponding sets of swipes, (2) rendering individual syllables upon completion of their corresponding individual swipes of the sets of swipes, and (3) rendering individual phonemes at respective times of user selection by dwelling on corresponding segments of the low-dimensional representation.

14. The method of claim 1, wherein rendering includes accessing a stored library of post-processed speech samples including variable-length versions of diphones used to match durations specified by the user input.

15. A computerized device, comprising:
one or more processors;
input/output circuitry for connecting the computerized device to a user interface device; and
memory coupled to the processors and the input/output circuitry, the memory storing computer program instructions that, when executed by the processors, cause the computerized device to perform a method for providing real-time synthesis of speech based on user input, the method including:
presenting a graphical user interface having a low-dimensional representation of a multi-dimensional phoneme space, a first dimension representing degree of vocal tract constriction and voicing, a second dimension representing location in a vocal tract;
receiving user input via the interface and translating received user input into a sequence of phonemes; and
rendering the sequence of phonemes on an audio output device.

* * * * *